US011347225B2

(12) United States Patent
Tatourian

(10) Patent No.: US 11,347,225 B2
(45) Date of Patent: May 31, 2022

(54) MECHANISM FOR CONFLICT RESOLUTION AND AVOIDANCE OF COLLISIONS FOR HIGHLY AUTOMATED AND AUTONOMOUS VEHICLES

(71) Applicant: Intel Corporation, Santa Clara, CA (US)

(72) Inventor: Igor Tatourian, Fountain Hills, AZ (US)

(73) Assignee: Intel Corporation, Santa Clara, CA (US)

( * ) Notice: Subject to any disclaimer, the term of this patent is extended or adjusted under 35 U.S.C. 154(b) by 129 days.

(21) Appl. No.: 16/267,945

(22) Filed: Feb. 5, 2019

(65) Prior Publication Data

US 2019/0171215 A1    Jun. 6, 2019

(51) Int. Cl.
*G05D 1/02* (2020.01)
*G05B 13/02* (2006.01)
*G05D 1/00* (2006.01)
*G06V 20/56* (2022.01)
(Continued)

(52) U.S. Cl.
CPC ....... *G05D 1/0214* (2013.01); *G05B 13/0265* (2013.01); *G05D 1/0088* (2013.01);
(Continued)

(58) Field of Classification Search
CPC .. G05D 1/0088; G05D 1/0214; G05D 1/0246; G05D 2201/02–0218;
(Continued)

(56) References Cited

U.S. PATENT DOCUMENTS 10,424,204 B1 * 9/2019 Han ................... G01S 15/931
2004/0215689 A1 * 10/2004 Dooley ............ G06K 9/00335
709/200
(Continued)

FOREIGN PATENT DOCUMENTS

CN   111524388    8/2020
DE   102020100077   8/2020

OTHER PUBLICATIONS

"German Application Serial No. 102020100077.4, Office Action dated Apr. 28, 2020", w English translation, 5 pgs.
(Continued)

*Primary Examiner* — James J Lee
*Assistant Examiner* — Alexander George Matta
(74) *Attorney, Agent, or Firm* — Schwegman Lundberg & Woessner, P.A.

(57) ABSTRACT

Systems and techniques for a mechanism for conflict resolution and avoidance of collisions for highly automated and autonomous vehicles are described herein. In an example, a gesture resolution system of an autonomous vehicle is adapted to detect, using input received from a camera, a moving object near the autonomous vehicle. The gesture resolution system may be further adapted to determine the moving object presents a risk of collision with the autonomous vehicle. The gesture resolution system may be further adapted to detect a gesture performed by the moving object. The gesture resolution system may be further adapted to determine a meaning of the gesture. The gesture resolution system may be further adapted to display, in a graphical user interface, the meaning for the gesture and an interface element to override the meaning of the gesture.

21 Claims, 7 Drawing Sheets

(51) Int. Cl.
*G06V 20/58* (2022.01)
*G06V 40/20* (2022.01)
*G06V 40/10* (2022.01)

(52) U.S. Cl.
CPC ........... *G05D 1/0246* (2013.01); *G06V 20/56* (2022.01); *G06V 20/58* (2022.01); *G06V 40/103* (2022.01); *G06V 40/113* (2022.01); *G06V 40/20* (2022.01); *G05D 2201/0212* (2013.01)

(58) Field of Classification Search
CPC ........... G06K 9/00335; G06K 9/00342; G06K 9/00348; G06K 9/00355; G06K 9/00369; G06K 9/00389; G06K 9/00791; G06K 9/00805; G05B 13/0265
See application file for complete search history.

(56) References Cited

U.S. PATENT DOCUMENTS

| | | | |
|---|---|---|---|
| 2018/0101179 A1* | 4/2018 | Louey | B60L 50/52 |
| 2018/0251219 A1* | 9/2018 | Taylor | G06F 3/017 |
| 2019/0171218 A1* | 6/2019 | Hammond | G05D 1/024 |
| 2019/0176820 A1* | 6/2019 | Pindeus | B60W 30/0956 |
| 2020/0005056 A1* | 1/2020 | Notheis | G06N 3/02 |
| 2020/0247426 A1* | 8/2020 | Rafferty | B60W 50/082 |

OTHER PUBLICATIONS

"German Application Serial No. 102026100077.4, Response filed Apr. 30, 2020 to Office Action dated Apr. 28, 2020", w English translation, 29 pgs.

* cited by examiner

MECHANISM FOR CONFLICT RESOLUTION AND AVOIDANCE OF COLLISIONS FOR HIGHLY AUTOMATED AND AUTONOMOUS VEHICLES

TECHNICAL FIELD

Embodiments described herein generally relate to autonomously driven vehicle and, in some embodiments, more specifically to the artificial intelligence for detecting actions surrounding the vehicle.

BACKGROUND

Autonomously driven vehicles, or driverless cars, have recently become a reality on the streets of the world. These vehicles are programmed with artificial intelligence to drive the vehicle, understand the rules of the road, and prevent accidents, such as with collision detection. This, however, is the simple part of programming an autonomously driven vehicle. On the streets of the real world there are many incongruencies and unpredictable actions that take place around the vehicle. Furthermore, the behaviors of people in similar situations may differ throughout different regions of the world.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
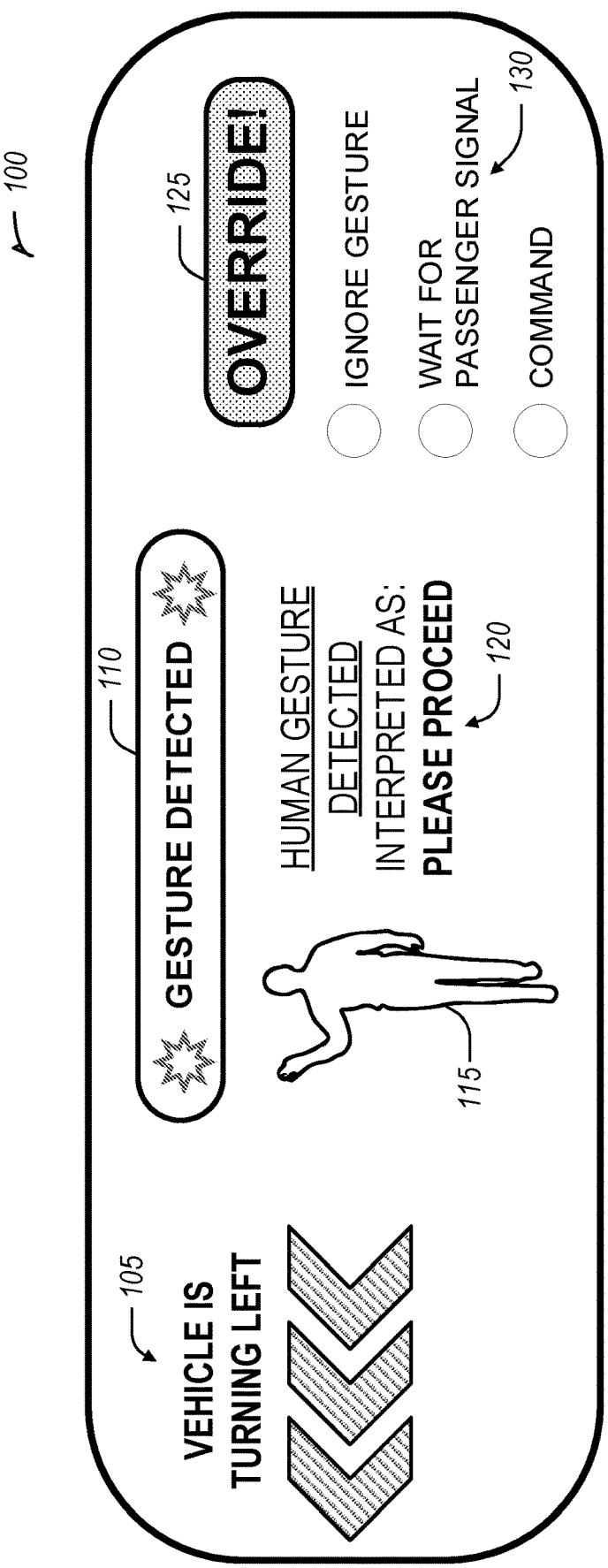
FIG. 1 illustrates an example of an interface that may appear in an autonomous vehicle, in accordance with some embodiments.

People travelling on roadways may use various of modes with walking, riding a bike, and using an automobile being some of the most common. As the paths of people intersect, it leads to scenarios where people may communicate with each other. However, for reasons such as distance or being confined within an automobile, it is not possible for people to hear each other, so they resort to using hand gestures to communicate. For example, a person driving may come to a stop sign with a crosswalk and a pedestrian standing on the corner. The driver may assume the pedestrian is going to use the crosswalk. However, the pedestrian is waiting to meet someone, and thus is not using the crosswalk and so gestures to the driver that they may proceed. In another example, a policeman may be directing traffic at an intersection where all direction communication is performed with hand and arm gestures.

The addition of autonomous vehicles creates a new challenge for the communication amongst roadway travelers. For the vehicle to communicate to people around it is a simple solution, such as screens or a loud speaker which indicates the vehicles intention. For example, when an autonomous vehicle is turning left, it may have screens positioned on one or more sides of the vehicle that display "Self-Driving Car—Turning Left." The vehicle is able to convey its planned movement to people around it. However, the challenge occurs when people around the vehicle attempt to communicate with the vehicle. The autonomous vehicle may have cameras to observe the actions of people around it. The autonomous vehicle may use an artificial intelligence system to interpret gestures made by people around the vehicle. However, around the world gestures may differ with similar gestures having a different meaning depending on the region of the world.

The presently disclosed gesture resolution system may present an interface to passengers of the autonomous vehicle to override the autonomous vehicle's planned action and interpretation of detected gestures. In an example, the autonomous vehicle may have a planned course of action, such as turning left at an intersection. The autonomous vehicle may identify a gesture of a pedestrian as indicating the vehicle should proceed. However, the pedestrian is not gesturing for the autonomous vehicle to proceed. The passenger interface may display the vehicle is going to turn left and that it has recognized the gesture as indicating the vehicle should proceed, as well as an interface element, such as a button, which allows for the passenger to override or stop the vehicle's planned course of action. In an embodiment, the interface may present options to the passenger for a suggested course of action.

The presently disclosed gesture resolution system may learn from the input of the passenger. The autonomous vehicle may be trained to recognize a set of gestures common in a region of the world, such as the United States. That training may be utilized in an autonomous vehicle in another region of the world, however some gestures may have a different meaning in that region. As the autonomous vehicle encounters gestures in that region it will interpret the gestures based on the training. If those interpretations are incorrect, then a passenger of the autonomous vehicle may override the interpretation. These overrides and any additional input, such as what the gesture means or how the passenger indicated to proceed, may continue to train the vehicle such that as the autonomous vehicle is further trained it adapts to the gestures of the region. In an embodiment, the autonomous vehicles of a region may share their training, such as in the cloud, for a collective learning of the gestures for a region.

As an example of differing gesture meanings, in most parts of the world, a nod of the head is considered a sign of acknowledgement or agreement. However, in some countries such as Greece and Bulgaria, a nod is considered a sign of disagreement or rejection. This type of difference in meaning for similar gestures may easily lead to misunderstandings and possible accidents for an autonomous vehicle that is not properly trained to recognize the meaning of gestures in the region. The presently disclosed system receives the override input and trains the vehicle as it operates. The presently disclosed system may be advantageous in smaller communities where local unique gestures may not be widely known, and thus less likely to be previously trained for the autonomous vehicle.

As an autonomous vehicle travels along a roadway, especially a populous area, there may hundreds of unpredictable events occurring around the autonomous vehicle. Prompting the passengers for each of these unpredictable events would be both overwhelming for the passenger and result in the vehicle moving only inches at a time. The presently disclosed gesture resolution system uses risk assessment to determine which unpredictable events to provide a prompt for the passenger.

For each unpredictable event detected by the gesture resolution system of the autonomous vehicle, the event is evaluated to determine a level of risk. Different factors may be used to determine the level of risk, including distance, speed of the actor, transportation method (e.g., walking, automobile), and the type of person (e.g., a child or adult). For example, a person walking at a regular pace at a further distance from the autonomous vehicle may be classified as a low risk but a group of children playing near the vehicle may be a high risk. If the gesture resolution system of the vehicle determines an unpredictable event is a high risk, such as if a risk assessment score exceeds a threshold, then the passengers may be prompted to ensure the vehicle avoids a potential accident.

The presently disclosed system discusses autonomous vehicles in the context of automobiles travelling upon roadways. However, it should be understood, the autonomous vehicle discussed herein shall not be limited to automobiles. The autonomous vehicle may be a motorcycle, truck, or an individual transportation device. The autonomous vehicle may be a boat or personal watercraft, or any other type of autonomous transportation device.

FIG. 1 illustrates an example of an interface 100 that may appear in an autonomous vehicle, in accordance with some embodiments. The interface 100 may be positioned on the dashboard of the vehicle for front seat passengers or on the back of the front seat for back seat passengers. The interface 100 may provide an indication 105 of the vehicle's planned course of action. For example, indication 105 presents text that tells the passenger what the vehicle is going to do and a set of arrows to further highlight the direction the vehicle will be moving. The vehicle may include an audio speaker and play an audio announcement similar to the information provided in indication 105.

When the autonomous vehicle detects an unpredictable event of potential risk, the interface 100 may include an alert 110. The alert 110 may bring to the passenger's attention that an unpredictable event has been detected, such as a gesture. The interface 100 may include an image of the unpredictable event, such as a person waving 115, so that the passenger knows which event is in question. The interface 100 may include a description 120 of the determined interpretation of the gesture or event.

If the description 120 of the determined interpretation is incorrect or it is not safe to proceed as described in indication 105, the passenger may select the override interface element 125. The autonomous vehicle may re-assess the unpredictable event. The passenger may further select from options 130 how the vehicle should proceed. As an example, options 130 include instructing the vehicle to ignore the gesture, instructing the vehicle to wait for the passenger before proceeding, or provide a command. If the passenger selects the option to wait for the passenger's signal, the interface may update with a selectable element, such as a button to proceed, that the passenger may select once it is safe for the vehicle to continue as described in indication 105. The vehicle may include a command option, such as to receive a voice command. The passenger may select the command option and describe the meaning of the gesture or how the vehicle should proceed. The passenger's description may be recorded and saved for future evaluation of gesture interpretation.

Figure 2:
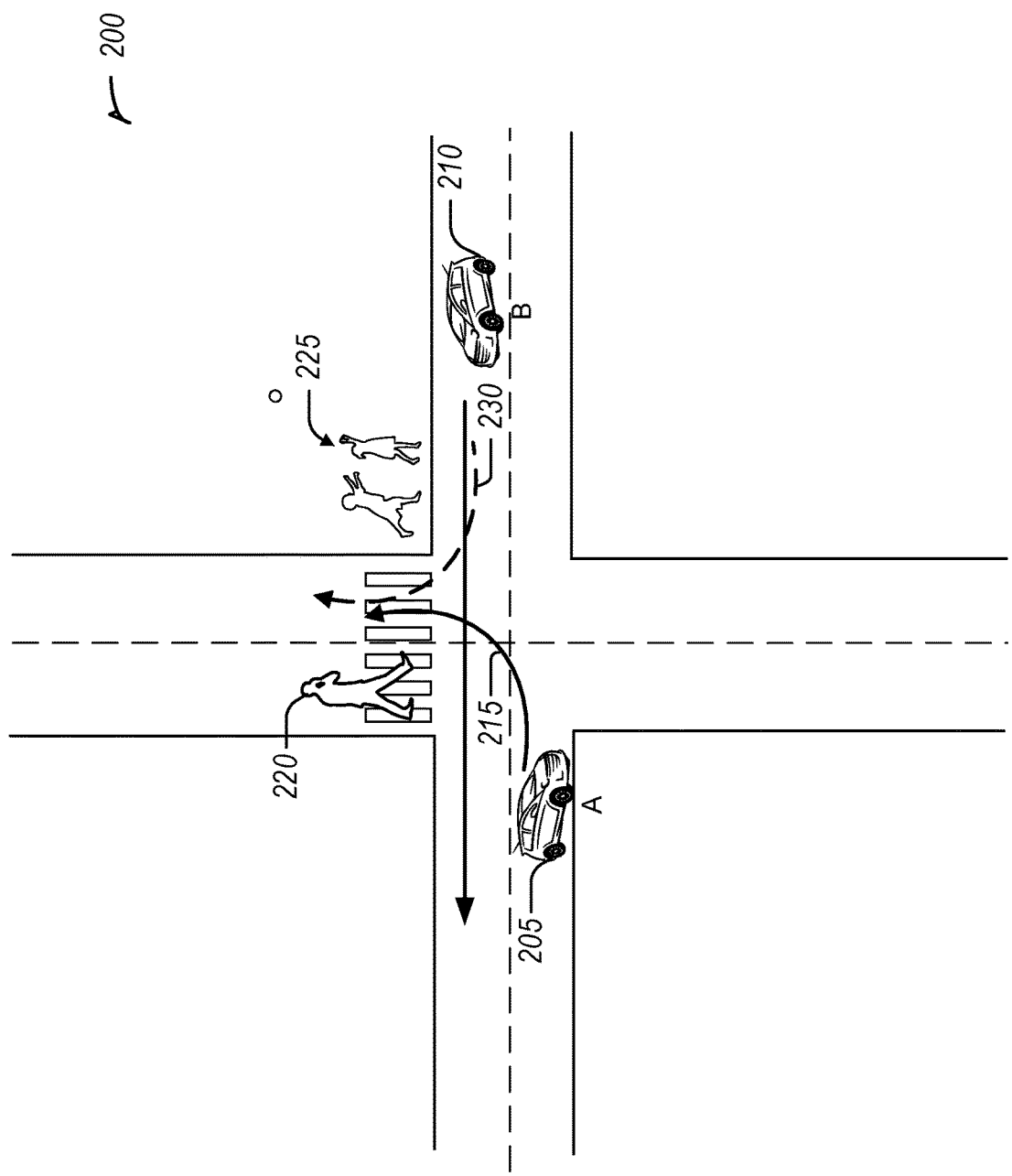
FIG. 2 illustrates an example roadway intersection, in accordance with some embodiments.

FIG. 2 illustrates an example roadway intersection 200, in accordance with some embodiments. In an example, car A 205 is an autonomously driven vehicle. At the intersection, car A 205 has a list of decisions to make, including whether it is safe to turn left (as indicated by path 215), whether car B 210 understands and accepts the decision of car A 205 to turn left, whether the car B 210 understands that it may cross even if it arrived at the intersection after the car A 205 and car B 210 understands the signal from car A 205 to car B 210 that car A 205 cannot turn at the moment because it is waiting for people on the crosswalk, and whether the people crossing the intersection understand that the car A 205 drives autonomously or not and what each car at the intersection is going to do. These decisions illustrate the uncertainty for the autonomous vehicle based on a limited number of actors around the vehicle.

In the example roadway intersection 200, car A 205 needs to turn left as indicated by path 215. However, a person 220 is crossing the street, thus preventing car A 205 from turning. Car B 210 reaches the intersection after car A 205, but because car A 205 is prevented from turning, car B 210 may proceed. This may lead to interaction between the cars to communicate that car B 210 can go ahead straight as indicated by path 230. If car B 210 is autonomously driven and car A 205 is driven by a person, then the person in car A 205 may attempt to signal to car B 210 that it may proceed. Autonomous car B 210 observes this gesture and interprets the gesture meaning. However, based on other risk factors, such as the person 220 crossing the street and children 225 playing near the intersection, other risks exist. Car B 210 may prompt the passengers for confirmation of the received gesture.

In another example, car A 205 is autonomously driven, and car B 210 is driven by a person. Car A 205 is going to turn left as indicated by path 215, but a person 220 crossing the street is preventing the turn. Car B 210 arrives at the intersection and is intending to turn right as indicated by path 230. However, the driver of car B 210 does not use the car's turn signal to indicate this. Car A 205 may attempt to communicate that car B 210 may proceed believing car B 210 intends to go straight. The driver of car B 210 may attempt to communicate that he intends to turn right, and thus is also prevented by person 220 crossing the street. The gestures the driver of car B 210 makes in an attempt to communicate this may be confusing and difficult to understand. In addition, the driver may make gestures which the autonomous vehicle car A 205 is not trained to recognize. This may result in car A 205 prompting the passengers with an interpretation of the driver's gestures as there is a high level of uncertainty of what the driver is communicating.

In a scenario, if it is not safe for autonomously driven car A 205 to turn left as autonomously driven car B 210 arrives at the intersection, car A 205 may inform car B 210 via vehicle-to-vehicle (V2V) communication that car A 205 is waiting and that car B 210 should cross. Car B 210 may acknowledge the communication and proceed. For both car A 205 and car B 210, external indicators and internal displays may show passengers in the cars what the cars are doing and provide for override of these actions.

Figure 3:
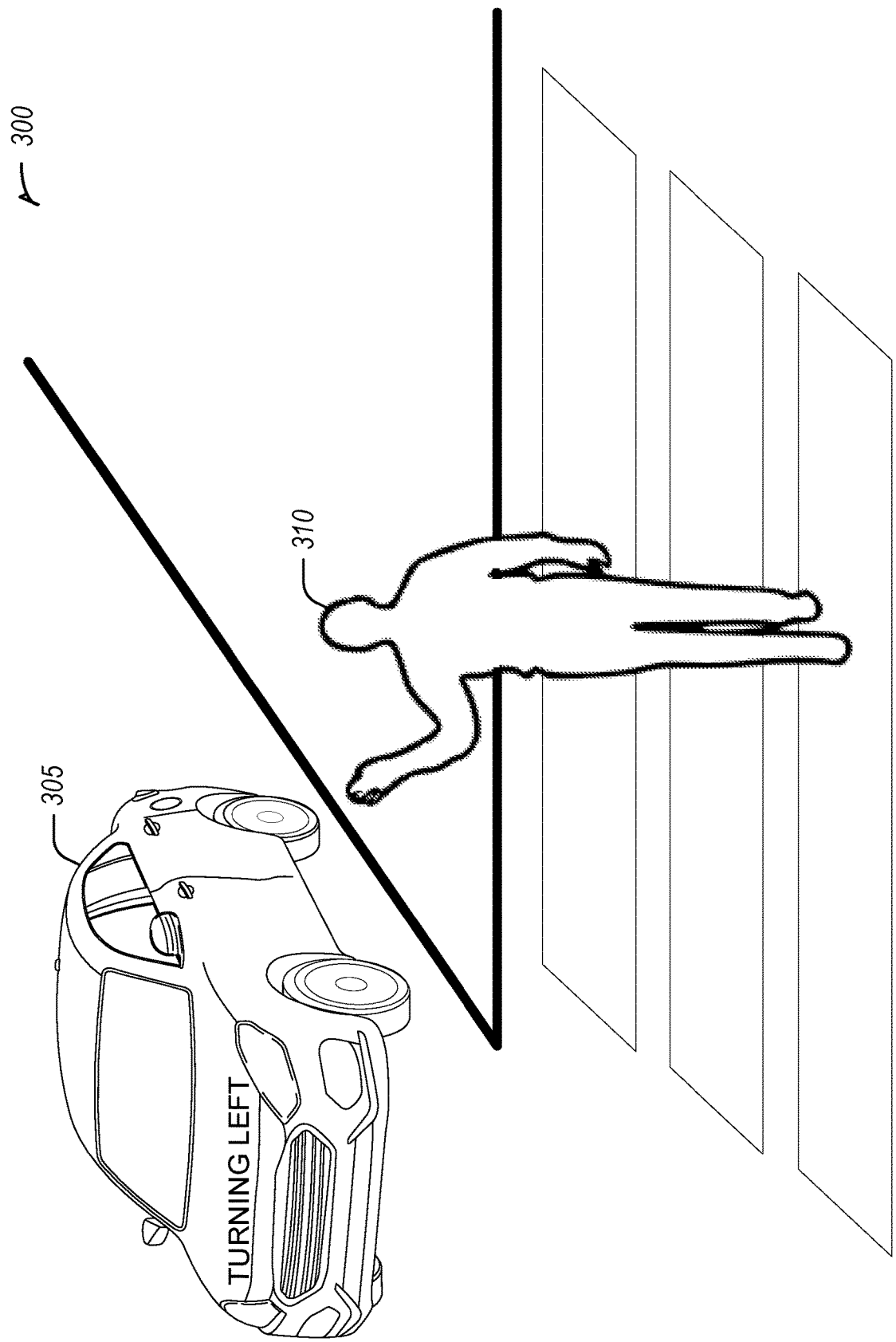
FIG. 3 illustrates an example roadway scenario, in accordance with some embodiments.

FIG. 3 illustrates an example roadway scenario 300, in accordance with some embodiments. In an example, car 305 is autonomously driven and has a course to turn left and car 305 determines it is safe to turn left. Car 305 may communicate the left turn like a legacy car (e.g., blinker lights on the corners of the car) but may have an external visual indicator, such as a display screen which informs that the vehicle is driving autonomously and that it is turning left. If car 305 decides that it is not safe to turn, it may have an external visual indicator that it is not turning left. A person 310 at the intersection may indicate that car 305 should proceed using a gesture. This may be a police officer. Car 305 may display an external indicator that it recognized a gesture from person 310 and interpreted the gesture as car 305 should proceed. A passenger inside car 305 may have a similar indicator and may be able to tune the interpretation of the gesture by overriding the trained gesture interpretation using the available options in the prompt.

In another example, person 310 may be crossing the street and when they see the car 305 about to turn, the person 310 may hold up their hand as a sign to the car 305 to stop and let them pass. However, the gesture is incorrectly recognized as waving. The gesture resolution system of car 305 decides it may proceed with the turn based on the person 310 waving. But because of the proximity of person 310 and the vector of motion for both car 305 and person 310 towards a collision, the gesture resolution system of car 305 may prompt a passenger for confirmation of the gesture interpretation. The passenger may override the waving interpretation to stop car 305 from proceeding with the turn and identify the gesture as a sign to stop. In a scenario of a police officer or an emergency vehicle, vehicle-to-everything (V2X) communication may be used to stop car 305.

Figure 4:
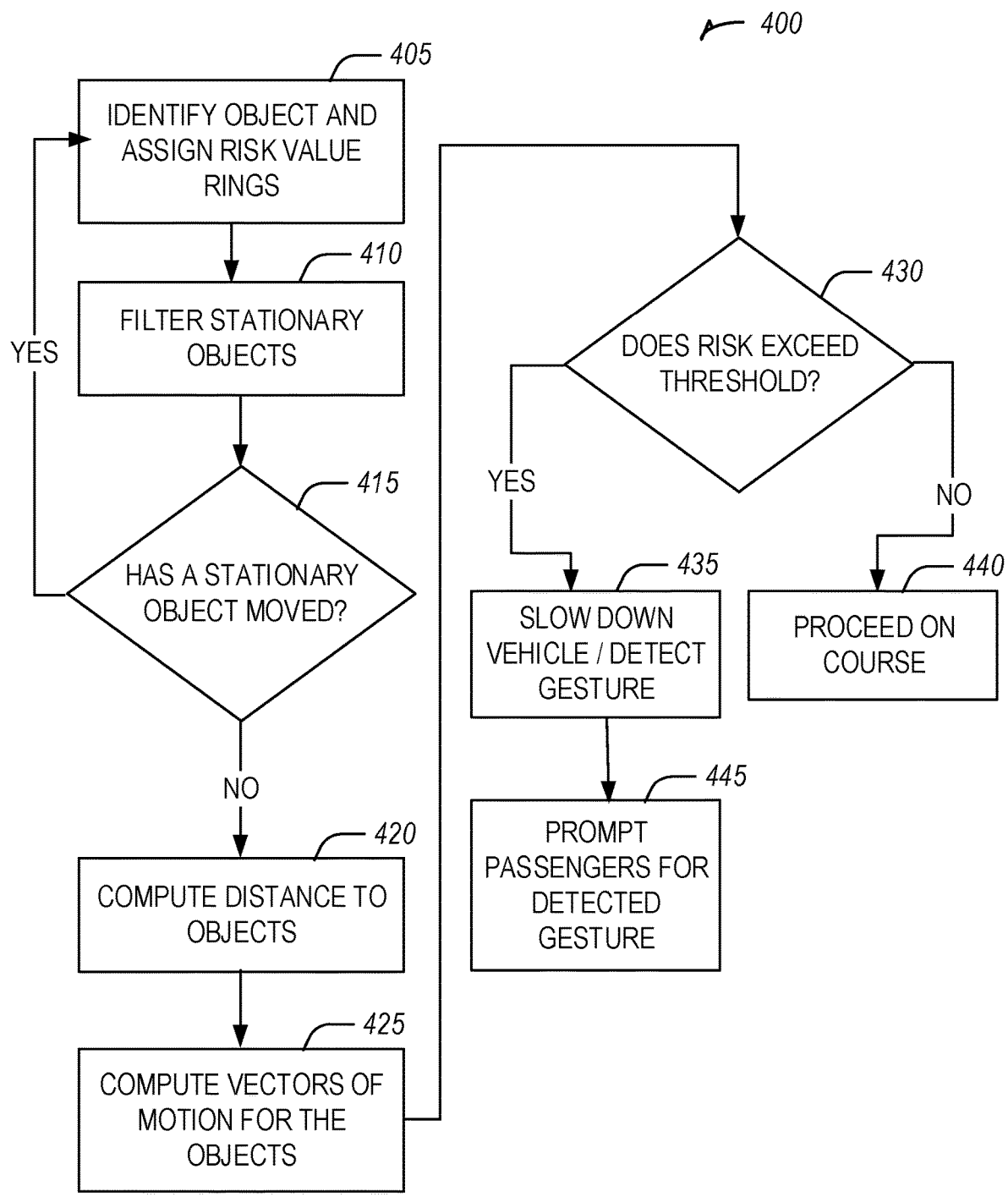
FIG. 4 illustrates an example flowchart process for the gesture resolution system, in accordance with some embodiments.

FIG. 4 illustrates an example flowchart process 400 for the gesture resolution system, in accordance with some embodiments. The process 400 evaluates the surrounding of the autonomous vehicle to determine possible collisions and thus the risk of collision. At operation 405, the gesture resolution system draws circumference rings around the vehicle and allocates a risk value to each ring. Further, the gesture resolution system identifies objects in the vehicle's path and determines a risk value for each object based on the ring each object places. At operation 410, the gesture resolution system filters out any stationary objects leaving only objects that are moving or may begin moving, such as humans and animals. At decision 415, if a stationary object moves, for example a car may be mistakenly classified to be stationary, the autonomous vehicle immediately slows down and recalculates the risk of collision for the object.

At operation 420, the distance to the objects is computed. At operation 425, the vectors of motions of the objects are computed towards the vector of motion of the vehicle. The vector of motion for an object is computed toward the vector of motion for the vehicle even if the object is not moving towards the vehicle at the moment as humans or animals may have erratic behavior and suddenly change their motion direction. In computing motion of humans towards the vehicle, a maximum running speed may be used.

At decision 430, the gesture resolution system determines if the probability of collision with an object exceeds a threshold. If the probability of a collision with the object exceeds a predetermined risk threshold, then at operation 435 the vehicle will slow down and, if possible, move to a side of the road farther away from the possible danger. The vehicle may prepare to stop if the risk is determined to be very high, for example if a child suddenly runs towards the vehicle. At operation 435, the gesture resolution system, based on the risk assessment, may determine if the object is performing a gesture. If the object is performing a gesture, then at operation 445, the passengers of the vehicle are prompted with the gesture detection interface for further gesture training. If the probability of a collision with the object does not exceed a threshold, at operation 440, the vehicle may continue on the determined course.

Figure 5:
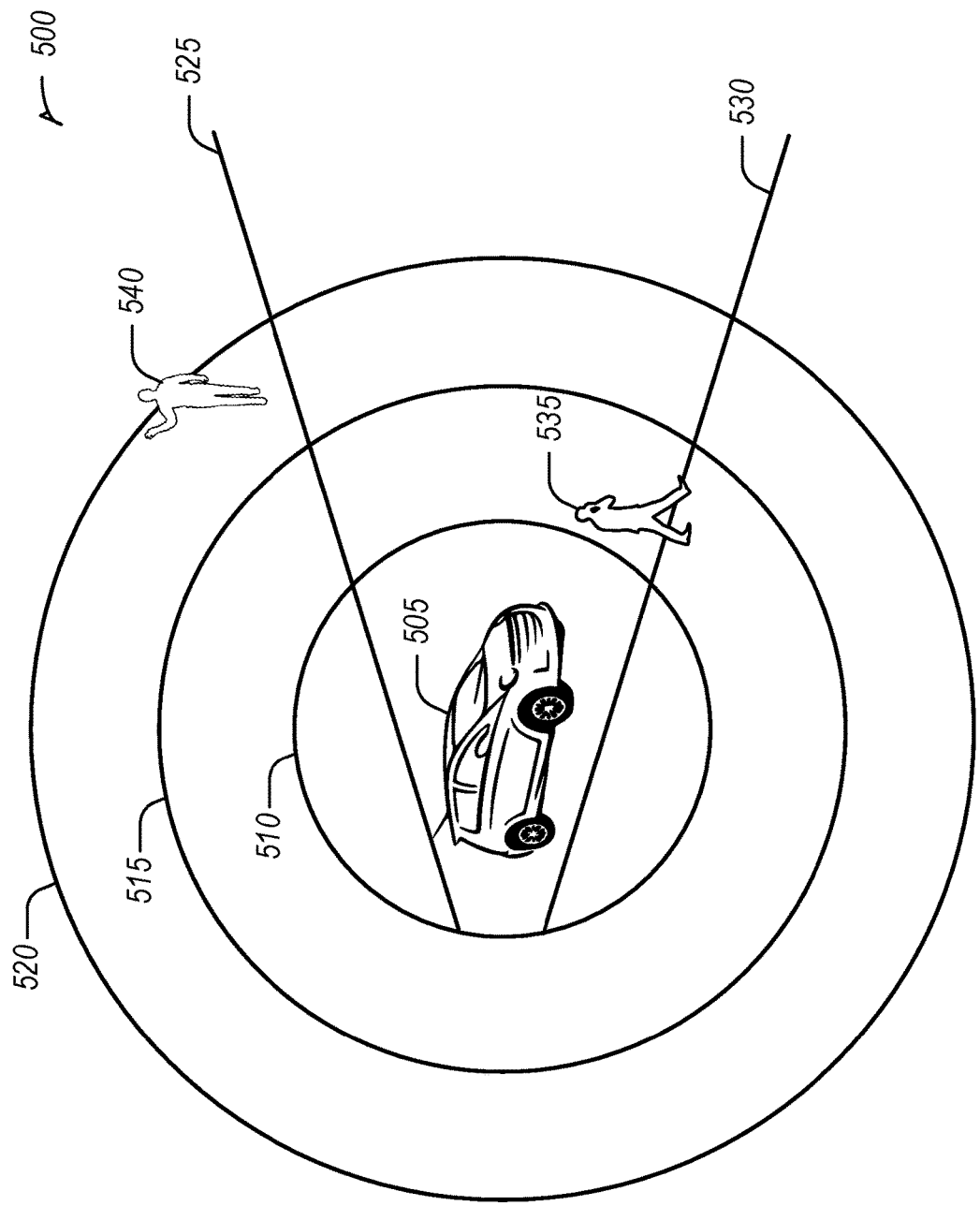
FIG. 5 illustrates a visual representation of a risk assessment, in accordance with some embodiments

FIG. 5 illustrates a visual representation 500 of a risk assessment, in accordance with some embodiments. As described in flowchart process 400 from FIG. 4, the gesture resolution system of car 505 draws rings, such as rings 510, 515, and 520, around vehicle 505. These rings are assigned a risk value, such as ring 510 may have a high-risk value, ring 515 may have a medium risk value, and ring 520 may have a low risk value. The gesture resolution system may determine vectors of motion for the car 505. For example, vector 525 and vector 530 represent the boundaries of vectors of motion for car 505.

The gesture resolution system then identifies moving objects within the rings, such as person 535 and person 540. Person 535 is within ring 515 thus has a medium risk value. Person 535 is also within the vectors of motion for car 505. Thus, person 535 presents a risk to car 505. If a gesture is detected from person 535, the passengers of car 505 may be prompted to confirm or override the gesture interpretation and further train the gesture prediction model. The gesture resolution system may be further trained to recognize factors which may indicate a person is distracted and thus a greater risk. For example, person 535 is talking on a mobile phone and possibly distracted. This distraction may increase the risk value assessed to person 535.

Person 540 is within ring 520 and thus has a low risk value. Furthermore, person 540 is outside the vectors of motion. Based on a low risk value distance and being outside a reasonable vector of motion for car 505, person 540 presents a low risk and thus a prompt will not be presented to the passengers if a gesture is detected from person 540. As car 505 and person 540 continue to move, the risk assessment value for person 540 may increase if person 540 moves into a higher risk value ring or enters the boundaries of the vectors of motion for car 505.

Children present a great risk factor as their actions are more likely to be unexpected. In addition, children may not understand the dangers presented by vehicles, including autonomous vehicles which may not understand child behavior. Furthermore, children may perform actions or gestures which may be incongruous with typical actions or gestures. For example, a child may enjoy waving at drivers and passers-by. However, the gesture detection of the autonomous vehicle may interpret the wave as a gesture the vehicle may proceed. The gesture detection system may evaluate a person to determine if it is a child, such as based on the size of the person. If the gesture detection system determines the person may be a child, then the risk factor may be weighted more heavily.

Determining the risk is based on how predictable the situation may be, or if it is a situation where something unexpected may arise. The less predictable and the more possibility of the unexpected, raises the risk factor.

Figure 6:
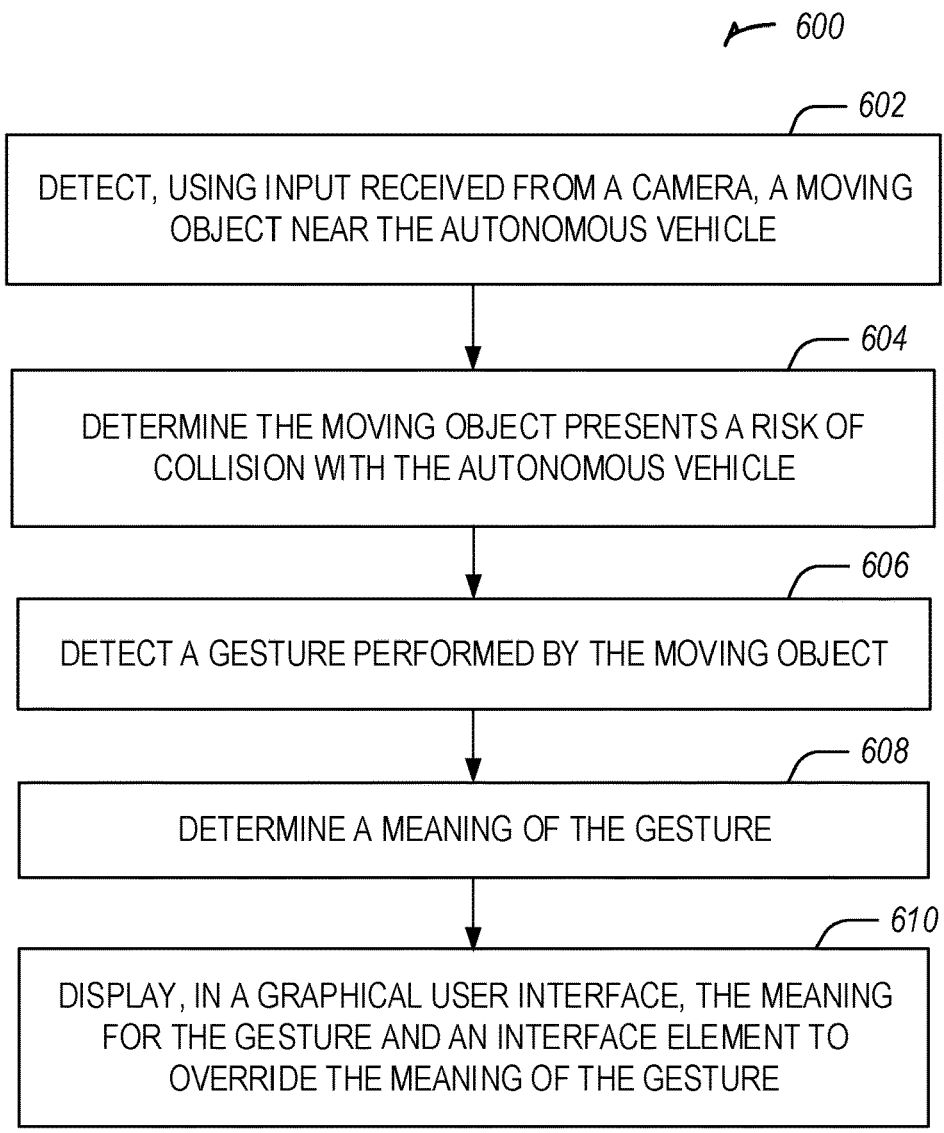
FIG. 6 illustrates a flowchart showing a technique for a gesture resolution system, in accordance with some embodiments.

FIG. 6 illustrates a flowchart showing a technique 600 for a gesture resolution system, in accordance with some embodiments. The technique 600 includes an operation 602 to detect, using input received from a camera, a moving object near the autonomous vehicle. The autonomous vehicle may be equipped with cameras and other sensors to observe the environment around the autonomous vehicle. Other sensors may include, but not limited to, microphones, motion sensors, and infrared cameras. The data received from the cameras and other sensors may be analyzed to detect moving objects. Image recognition may be used to identify humans, animals, and other vehicles.

The technique 600 includes an operation 604 to determine the moving object presents a risk of collision with the autonomous vehicle. As with a human driven vehicle, an autonomous vehicle must avoid collisions with other objects. From the data received about the moving object, a determination is made to determine the potential for collision between the moving object and the autonomous vehicle. To determine a risk of collision, a risk assessment value may be calculated. If the risk assessment value exceeds a predetermined threshold value, then a high potential for collision with the moving object may exist and further precautionary steps may be taken by the autonomous vehicle.

The risk assessment value may be based on multiple factors such as the distance between the moving object and the autonomous vehicle, and the type of moving object. For example, the moving object may be an adult, a child, an animal, a person riding a bicycle, or another automobile. Each of these types of moving objects present different levels of risk, as an adult may be less likely to have erratic behavior, while a child or animal has a higher potential for uncertain behavior. Detailed detection of the moving object may further include determining the moving object is a police officer or roadway authority, such as a construction worker for rerouting traffic.

A factor for the risk assessment value may be determining the probability of collision between the autonomous vehicle and the moving object. Determining the probability of collision between the autonomous vehicle and the moving object may further include an operation to calculate vectors of motion for the moving object. Determining the probability of collision between the autonomous vehicle and the moving object may further include an operation to calculate vectors of motion for the autonomous vehicle. Determining the probability of collision between the autonomous vehicle and the moving object may further include an operation to determine the probability of collision using the vectors of motion for the moving object and vectors of motion for the autonomous vehicle.

The technique 600 includes an operation 606 to detect a gesture performed by the moving object. The moving object, such an adult, may attempt to communicate with the autonomous vehicle. The communication may be through the use of gestures. The moving object may gesture for the autonomous vehicle to proceed or may gesture to provide a warning, such as to stop for an obstruction. The gesture may originate from inside the moving object, such as a driver of another vehicle.

The technique 600 includes an operation 608 to determine a meaning of the gesture. A model trained using known gestures and their meaning may be used to identify the meaning of the gesture. The meaning of the gesture may further be used to determine the next action for the autonomous vehicle. For example, if the gesture is a brushing motion, meaning to go ahead, the vehicle may continue with its current movement. If the gesture is a steady held hand, meaning to stop, the vehicle may stop and reevaluate the environment to determine a safe time to proceed.

The technique 600 includes an operation 610 to display, in a graphical user interface (GUI), the meaning for the gesture and an interface element to override the meaning of the gesture. A graphical user interface may be presented to passengers inside the autonomous vehicle. The GUI may display the intended action of the autonomous vehicle, such as turning left or driving forward. The GUI may display a detected gesture, along with an image of the gesture and the determined meaning of the gesture. The GUI may include an interface element for a passenger to stop the autonomous vehicle and override the intended action of the autonomous vehicle. The GUI may include interface element for the passenger to provide directives upon interfacing with the override interface element. The GUI may provide functionality for the passenger to provide input for the meaning of the gesture or the next action for the autonomous vehicle. The technique 600 may further include operations to stop movement of the autonomous vehicle upon activation of the interface element.

Figure 7:
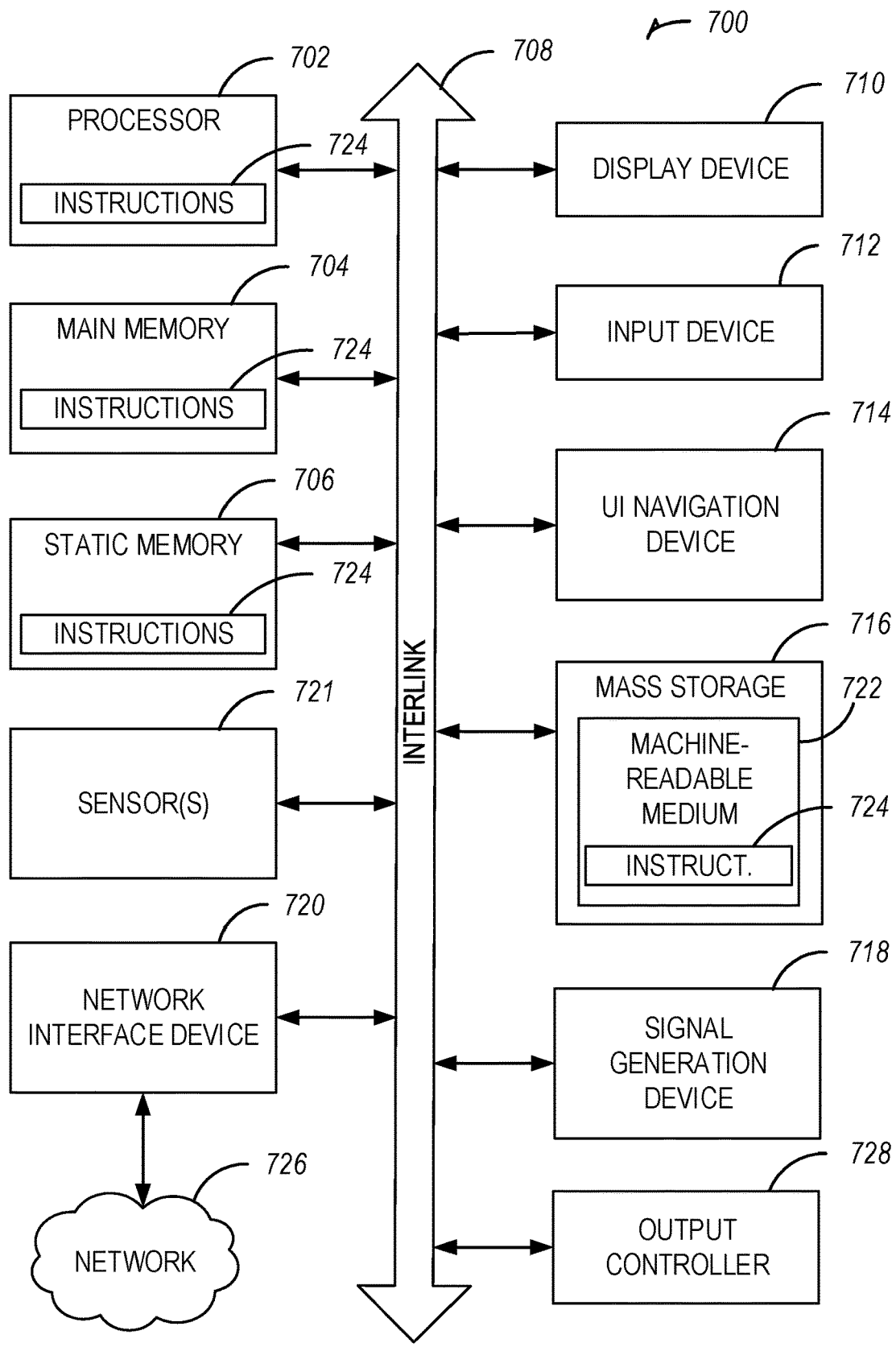
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 700 may include a hardware processor 702 (e.g., a central processing unit (CPU), a graphics processing unit (GPU), a hardware processor core, field programmable gate array (FPGA), or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or used by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

Example 1 is a system for gesture resolution with an autonomous vehicle, comprising: at least one processor; and memory including instructions that, when executed by the at least one processor, cause the at least one processor to: detect, using input received from a camera, a moving object near the autonomous vehicle; determine the moving object presents a risk of collision with the autonomous vehicle; detect a gesture performed by the moving object; determine a meaning of the gesture; and display, in a graphical user interface, the meaning for the gesture and an interface element to override the meaning of the gesture.

In Example 2, the subject matter of Example 1 includes, wherein to determine the moving object presents a risk of collision further comprising instructions to: calculate a risk assessment value; and determine the risk assessment value exceeds a predetermined threshold.

In Example 3, the subject matter of Example 2 includes, wherein to calculate the risk assessment value, further comprising instructions to: calculate vectors of motion for the moving object; calculate vectors of motion for the autonomous vehicle; and determine, based on the vectors of motion for the moving object and vectors of motion for the autonomous vehicle, a probability of collision between the autonomous vehicle and the moving object.

In Example 4, the subject matter of Examples 2-3 includes, wherein the risk assessment value is based on the distance between the moving object and the autonomous vehicle.

In Example 5, the subject matter of Examples 2-4 includes, wherein the risk assessment value is based on identifying the type of moving object.

In Example 6, the subject matter of Examples 1-5 includes, wherein activating the interface element on the graphical user interface causes the autonomous vehicle to stop current movements.

In Example 7, the subject matter of Examples 1-6 includes, instructions to receive input describing a new meaning of the gesture.

In Example 8, the subject matter of Examples 1-7 includes, instructions to determine an action for the autonomous vehicle based on the meaning of the gesture.

Example 9 is a method for gesture resolution with an autonomous vehicle, comprising: detecting, using input received from a camera, a moving object near the autonomous vehicle; determining the moving object presents a risk of collision with the autonomous vehicle; detecting a gesture performed by the moving object; determining a meaning of the gesture; and displaying, in a graphical user interface, the meaning for the gesture and an interface element to override the meaning of the gesture.

In Example 10, the subject matter of Example 9 includes, wherein to determine the moving object presents a risk of collision further comprising: calculating a risk assessment value; and determining the risk assessment value exceeds a predetermined threshold.

In Example 11, the subject matter of Example 10 includes, wherein to calculate the risk assessment value, further comprising: calculating vectors of motion for the moving object; calculating vectors of motion for the autonomous vehicle; and determining, based on the vectors of motion for the moving object and vectors of motion for the autonomous vehicle, a probability of collision between the autonomous vehicle and the moving object.

In Example 12, the subject matter of Examples 10-11 includes, wherein the risk assessment value is based on the distance between the moving object and the autonomous vehicle.

In Example 13, the subject matter of Examples 10-12 includes, wherein the risk assessment value is based on identifying the type of moving object.

In Example 14, the subject matter of Examples 9-13 includes, wherein activating the interface element on the graphical user interface causes the autonomous vehicle to stop current movements.

In Example 15, the subject matter of Examples 9-14 includes, instructions to receive input describing a new meaning of the gesture.

In Example 16, the subject matter of Examples 9-15 includes, instructions to determine an action for the autonomous vehicle based on the meaning of the gesture.

Example 17 is at least one computer readable medium including instructions for gesture resolution with an autonomous vehicle that when executed by at least one processor, cause the at least one processor to: detect, using input received from a camera, a moving object near the autonomous vehicle; determine the moving object presents a risk of collision with the autonomous vehicle; detect a gesture performed by the moving object; determine a meaning of the gesture; and display, in a graphical user interface, the meaning for the gesture and an interface element to override the meaning of the gesture.

In Example 18, the subject matter of Example 17 includes, wherein to determine the moving object presents a risk of collision further comprising instructions to: calculate a risk assessment value; and determine the risk assessment value exceeds a predetermined threshold.

In Example 19, the subject matter of Example 18 includes, wherein to calculate the risk assessment value, further comprising instructions to: calculate vectors of motion for the moving object; calculate vectors of motion for the autonomous vehicle; and determine, based on the vectors of motion for the moving object and vectors of motion for the autonomous vehicle, a probability of collision between the autonomous vehicle and the moving object.

In Example 20, the subject matter of Examples 18-19 includes, wherein the risk assessment value is based on the distance between the moving object and the autonomous vehicle.

In Example 21, the subject matter of Examples 18-20 includes, wherein the risk assessment value is based on identifying the type of moving object.

In Example 22, the subject matter of Examples 17-21 includes, wherein activating the interface element on the graphical user interface causes the autonomous vehicle to stop current movements.

In Example 23, the subject matter of Examples 17-22 includes, instructions to receive input describing a new meaning of the gesture.

In Example 24, the subject matter of Examples 17-23 includes, instructions to determine an action for the autonomous vehicle based on the meaning of the gesture.

Example 25 is a system for gesture resolution with an autonomous vehicle, comprising: means for detecting, using input received from a camera, a moving object near the autonomous vehicle; means for determining the moving object presents a risk of collision with the autonomous vehicle; means for detecting a gesture performed by the moving object; means for determining a meaning of the gesture; and means for displaying, in a graphical user interface, the meaning for the gesture and an interface element to override the meaning of the gesture.

In Example 26, the subject matter of Example 25 includes, wherein to determine the moving object presents a risk of collision further comprising instructions to: means for calculating a risk assessment value; and means for determining the risk assessment value exceeds a predetermined threshold.

In Example 27, the subject matter of Example 26 includes, wherein to calculate the risk assessment value, further comprising instructions to: means for calculating vectors of motion for the moving object; means for calculating vectors of motion for the autonomous vehicle; and means for determining, based on the vectors of motion for the moving object and vectors of motion for the autonomous vehicle, a probability of collision between the autonomous vehicle and the moving object.

In Example 28, the subject matter of Examples 26-27 includes, wherein the risk assessment value is based on the distance between the moving object and the autonomous vehicle.

In Example 29, the subject matter of Examples 26-28 includes, wherein the risk assessment value is based on identifying the type of moving object.

In Example 30, the subject matter of Examples 25-29 includes, wherein activating the interface element on the graphical user interface causes the autonomous vehicle to stop current movements.

In Example 31, the subject matter of Examples 25-30 includes, instructions to receive input describing a new meaning of the gesture.

In Example 32, the subject matter of Examples 25-31 includes, instructions to determine an action for the autonomous vehicle based on the meaning of the gesture.

Example 33 is at least one machine-readable medium including instructions that, when executed by processing circuitry, cause the processing circuitry to perform operations to implement of any of Examples 1-32.

Example 34 is an apparatus comprising means to implement of any of Examples 1-32.

Example 35 is a system to implement of any of Examples 1-32.

Example 36 is a method to implement of any of Examples 1-32.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for gesture resolution with an autonomous vehicle, comprising:
    at least one processor; and
    memory including instructions that, when executed by the at least one processor, cause the at least one processor to:
        detect, using input received from a camera, a moving object in an environment exterior to the autonomous vehicle;
        determine the moving object presents a safety risk with the autonomous vehicle;
        in response to determining the safety risk with the moving object, detect a gesture performed by the moving object;
        determine, using a trained gesture interpretation model, a response to the gesture;
        provide a user input option, via a graphical user interface within the autonomous vehicle, for a passenger to override an interpretation of the gesture or override an intended action of the vehicle in response to the gesture, the user interface displaying a meaning for the interpretation of gesture, wherein training of a gesture interpretation model is based on inputs of gesture data and selection from the user input option; and
        execute a command for the autonomous vehicle based on the determined response to the gesture.

2. The system of claim 1, further comprising instructions to determine the moving object presents a risk of collision, including instructions to:
    calculate a risk assessment value; and
    determine the risk assessment value exceeds a predetermined threshold.

3. The system of claim 2, wherein to calculate the risk assessment value, further comprising instructions to:
    calculate vectors of motion for the moving object;
    calculate vectors of motion for the autonomous vehicle; and
    determine, based on the vectors of motion for the moving object and vectors of motion for the autonomous vehicle, a probability of collision between the autonomous vehicle and the moving object.

4. The system of claim 2, wherein the risk assessment value is based on the distance between the moving object and the autonomous vehicle.

5. The system of claim 2, wherein the risk assessment value is based on identifying the type of moving object.

6. The system of claim 1, wherein user input received via the graphical user interface causes the autonomous vehicle to stop current movements.

7. The system of claim 1, further comprising instructions to:
    receive an override indication for the interpretation of the gesture from the graphical user interface;
    receive input describing a new interpretation of the gesture; and
    store the gesture and the new interpretation of the gesture.

8. A method for gesture resolution with an autonomous vehicle, comprising:
    detecting, using input received from a camera, a moving object in an environment exterior to the autonomous vehicle;
    determining the moving object presents a safety risk with the autonomous vehicle;
    in response to determining the safety risk with the moving object, detecting a gesture performed by the moving object;
    determining, using a trained gesture interpretation model, a response to the gesture;
    providing a user input option, via a graphical user interface within the autonomous vehicle, for a passenger to override an interpretation of the gesture or override an intended action of the vehicle in response to the gesture, the user interface displaying a meaning for the interpretation of gesture, wherein training of a gesture interpretation model is based on inputs of gesture data and selection from the user input option; and execute a command for the autonomous vehicle based on the determined response to the gesture.

9. The method of claim 8, further comprising determining the moving object presents a risk of collision, comprising:
calculating a risk assessment value; and
determining the risk assessment value exceeds a predetermined threshold.

10. The method of claim 9, wherein to calculate the risk assessment value, further comprising:
calculating vectors of motion for the moving object;
calculating vectors of motion for the autonomous vehicle; and
determining, based on the vectors of motion for the moving object and vectors of motion for the autonomous vehicle, a probability of collision between the autonomous vehicle and the moving object.

11. The method of claim 9, wherein the risk assessment value is based on the distance between the moving object and the autonomous vehicle.

12. The method of claim 9, wherein the risk assessment value is based on identifying the type of moving object.

13. The method of claim 8, wherein user input received via the graphical user interface causes the autonomous vehicle to stop current movements.

14. The method of claim 8, further comprising:
receiving an override indication for the interpretation of the gesture from the graphical user interface;
receiving input describing a new interpretation of the gesture; and
storing the gesture and the new interpretation of the gesture.

15. At least one non-transitory computer readable medium including instructions for gesture resolution with an autonomous vehicle that when executed by at least one processor, cause the at least one processor to:
detect, using input received from a camera, a moving object in an environment exterior to the autonomous vehicle;
determine the moving object presents a safety risk with the autonomous vehicle;
in response to determining the safety risk with the moving object, detect a gesture performed by the moving object;
determine, using a trained gesture interpretation model, a response to the gesture;
provide a user input option, via a graphical user interface within the autonomous vehicle, for a passenger to override an interpretation of the gesture or override an intended action of the vehicle in response to the gesture, the user interface displaying a meaning for the interpretation of gesture, wherein training of a gesture interpretation model is based on inputs of gesture data and selection from the user input option; and
execute a command for the autonomous vehicle based on the determined response to the gesture.

16. The at least one non-transitory computer readable medium of claim 15, further comprising instructions to determine the moving object presents a risk of collision, including instructions to:
calculate a risk assessment value; and
determine the risk assessment value exceeds a predetermined threshold.

17. The at least one non-transitory computer readable medium of claim 16, wherein to calculate the risk assessment value, further comprising instructions to:
calculate vectors of motion for the moving object;
calculate vectors of motion for the autonomous vehicle; and
determine, based on the vectors of motion for the moving object and vectors of motion for the autonomous vehicle, a probability of collision between the autonomous vehicle and the moving object.

18. The at least one non-transitory computer readable medium of claim 16, wherein the risk assessment value is based on the distance between the moving object and the autonomous vehicle.

19. The at least one non-transitory computer readable medium of claim 16, wherein the risk assessment value is based on identifying the type of moving object.

20. The at least one non-transitory computer readable medium of claim 15, wherein user input received via the graphical user interface causes the autonomous vehicle to stop current movements.

21. The at least one non-transitory computer readable medium of claim 15, further comprising instructions to:
receive an override indication for the interpretation of the gesture from the graphical user interface;
receive input describing a new interpretation of the gesture; and
store the gesture and the new interpretation of the gesture.

* * * * *